June 28, 1932.   A. W. CLARKE   1,865,408
ARTICULATED CAR
Filed March 11, 1931   2 Sheets-Sheet 1

INVENTOR
Allen W. Clarke
BY F. H. Gibbs
ATTORNEY

June 28, 1932.  A. W. CLARKE  1,865,408
ARTICULATED CAR
Filed March 11, 1931   2 Sheets-Sheet 2
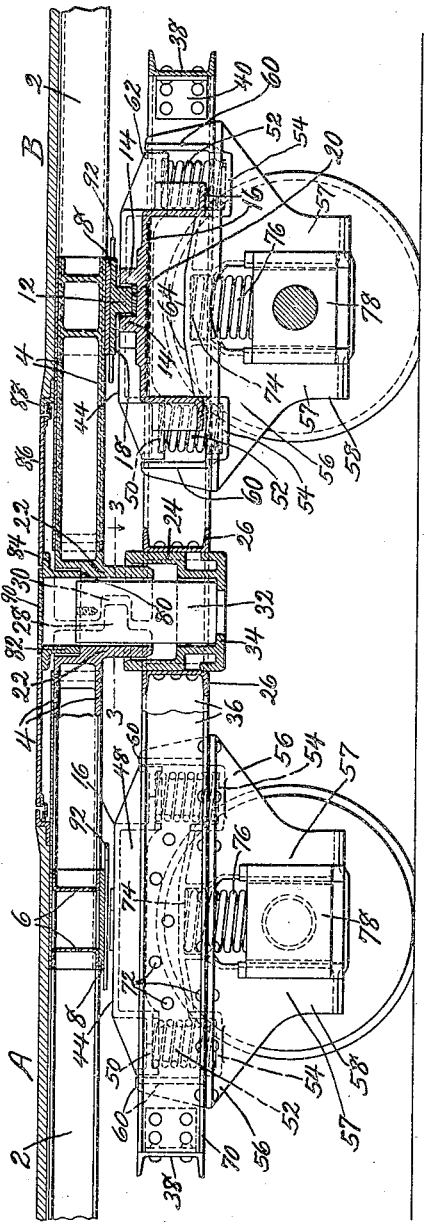
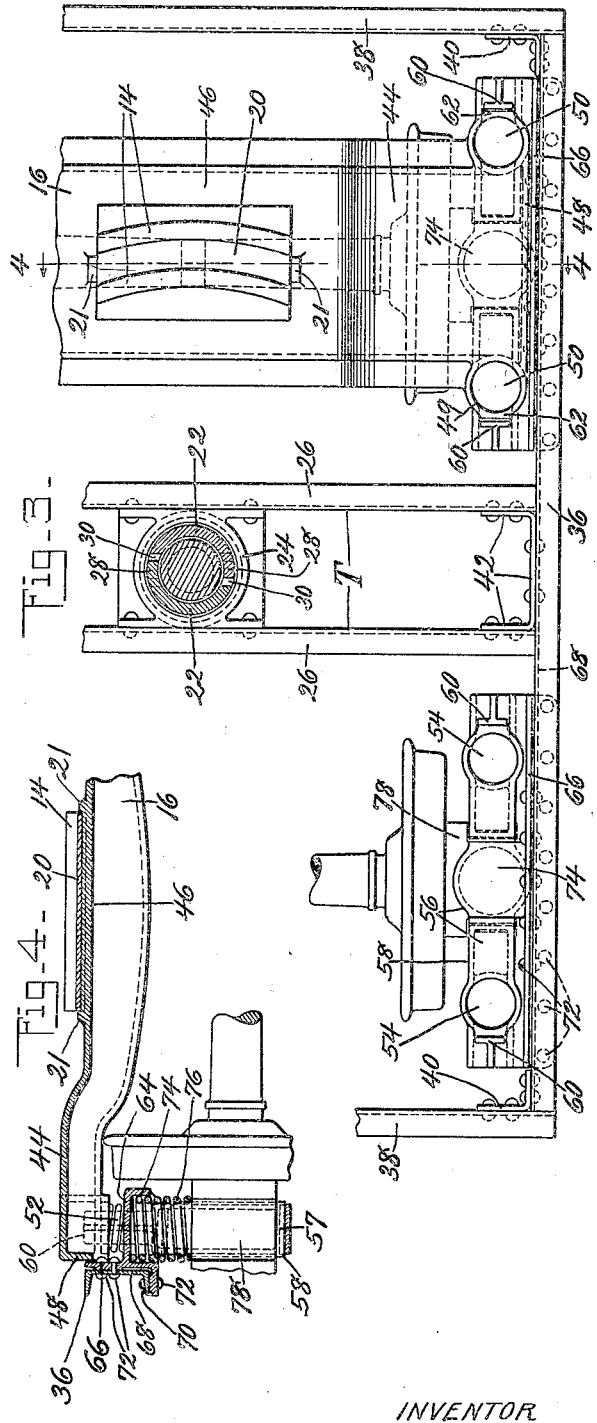
INVENTOR
Allen W. Clarke
BY
ATTORNEY Patented June 28, 1932

1,865,408

UNITED STATES PATENT OFFICE

ALLEN W. CLARKE, OF RIDGEWOOD, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed March 11, 1931. Serial No. 521,669.

This invention relates to articulated cars of the type in which the adjacent end portions of two car bodies are supported for relative horizontal swiveling by a single truck arranged therebeneath.

One object of this invention is the provision of a new and improved railway car truck.

Another object of this invention is the provision of a railway car truck for supporting the adjacent end portions of two bodies of an articulated car, said truck having a pair of bolsters for supporting the said bodies and on which the bodies horizontally shift or swivel, said truck further having a center casting defining the point of articulation or the axis of swiveling movement.

Still another object of this invention is the provision of an articulated car comprising a pair of car bodies having their adjacent end portions supported respectively by a pair of truck bolsters, the said end portions being capable of independent horizontal shifting or swiveling relative to the truck, and said adjacent end portions being extended and arranged within a truck center casting which defines the axis of swiveling movement and which restrains the bodies against relative sidewise shifting and which also serves to transmit pulling stresses from one body to the other and from the bodies to the truck.

A further object of this invention is the provision of an articulated car having the adjacent end portions of two car bodies extended into a transverse truck stiffening member to restrain the adjacent end portions against relative sidewise shifting, said adjacent end portions being inter-engaged to restrain the same against relative vertical shifting.

A still further object of this invention is the provision of an articulated car having the adjacent end portions of two car bodies supported respectively by a pair of truck bolsters, said end portions being extended into a truck center casting carried by a transverse truck stiffening member interposed between the bolsters and having a buffing element interposed between the said end portions and supported by the casting; the said buffing element being adapted to retain the adjacent end portions of said bodies in proper spaced relation and defining the axis of swiveling movement for the bodies.

This invention also contemplates the provision of a new and improved pedestal for railway car trucks.

Another object of this invention is the provision of a new and improved pedestal for car trucks having means for supporting a truck bolster on the head portion thereof, said head portion having means for restraining the bolster against longitudinal movement relative to the truck.

Other objects and advantages of this invention will be apparent from the following description taken in conjunction with the accompanying drawings in which:

Fig. 2 is a sectional view on the line 2—2, Fig. 1.

Fig. 3 is a top plan view of a portion of the truck, a part of the figure being taken on the line 3—3, Fig. 2, the view having certain parts omitted, and Fig. 4 is a sectional view on the line 4—4, Fig. 3.

Figure 1:
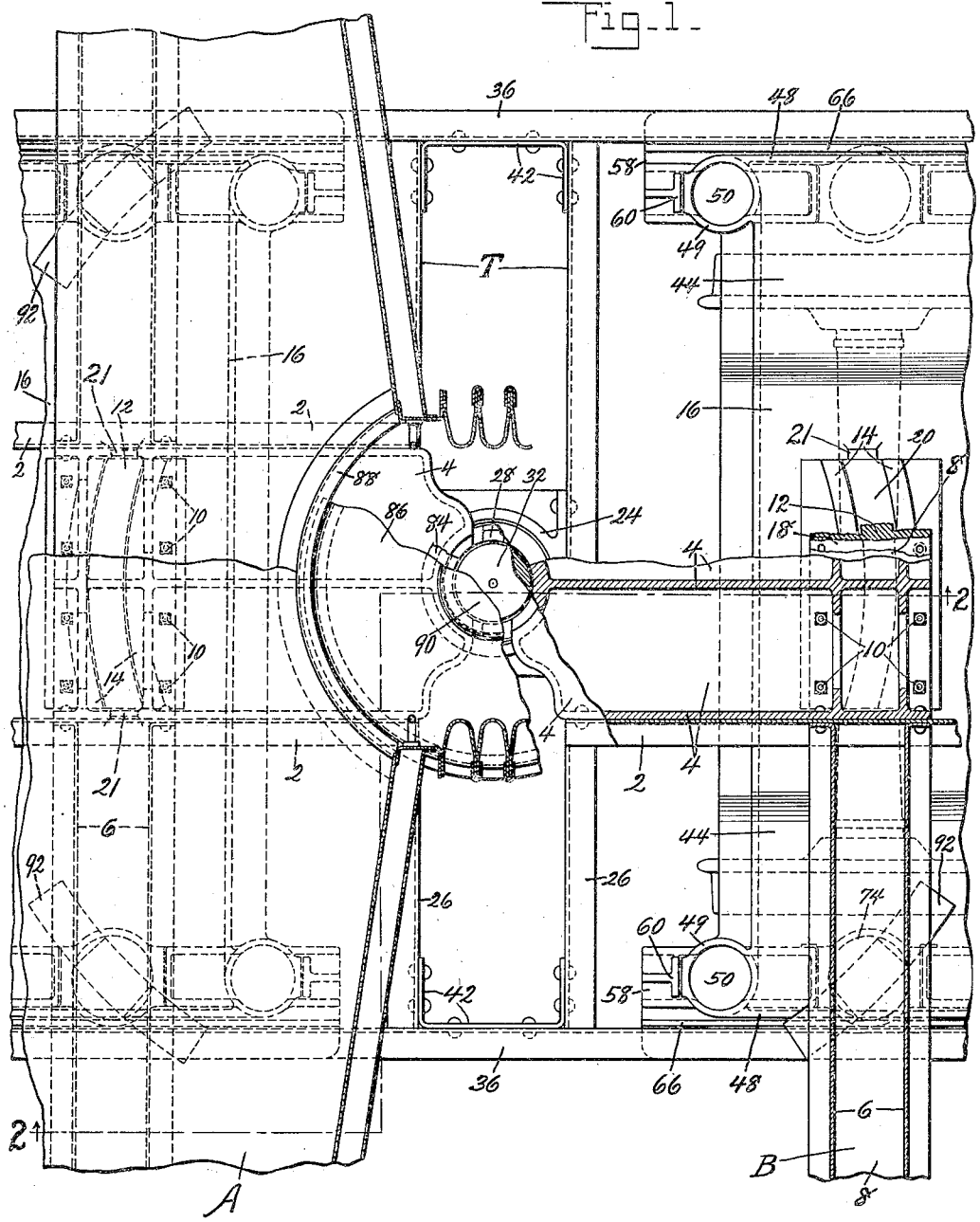
Figure 1 is a fragmentary top plan view of the adjacent end portions of two bodies of an articulated car, certain parts being shown in section and other parts being broken away.

The drawings disclose the adjacent end portions of two car bodies. More particularly they disclose in detail, the end portions of the underframes of two car bodies forming an articulated car. They are indicated generally at A and B and include center sills 2 to which are secured body connection castings 4 which form parts of the underframes. Extending between the body side sills (not shown) are body bolsters 6, which include bottom cover plates 8, to which latter are secured by suitable fasteners 10, arcuate track members 12 arranged for shifting movement in guides 14 secured to the upper surfaces of truck bolsters 16. The tracks and guides define connected or cooperating body and truck bearing members as will be apparent, and as clearly shown in Fig. 2, the tracks 12 are formed as parts of plate members 18 and are secured to the body bolster bottom cover plate and to castings 4 by the fasteners 10, thus providing a substantially unitary construction which is extremely rugged to withstand service conditions. The guides 14 are each provided with wear strips 20 retained therein in any suitable manner as by end stops 21.

The body castings 4 are provided at their forward ends with longitudinally recessed depending projections 22 which extend into a truck center casting 24 carried by a transverse truck member T formed by a spaced pair of transoms 26 arranged between the before mentioned truck bolsters 16.

As shown more clearly in broken lines in Fig. 2 the side edges of the projections 22 are provided respectively with a tongue 28 and a groove 30, so arranged that when the bodies are assembled, the tongue of one casting is arranged in the groove of the opposite casting. The tongue and grooves are so proportioned as to permit a limited amount of relative vertical shifting of the adjacent end portions of the bodies which is necessary because of variations in track grades, but excessive relative vertical shifting is prevented by the interengagement of the castings 4, or, in other words, the interengagement of the adjacent end portions of the car bodies.

The projections 22 are arranged around a combined spacer and buffer element 32 comprising, in the instance shown, a pin positioned in the recesses formed in the projections and extending into the center casting 24 and supported by the base 34 thereof. As will be obvious, the buffer and spacer element defines the point of articulation or, in other words, the axis of swiveling movement of the bodies A and B. In addition, it will be apparent that the pin 32 also aids in preventing excessive relative sidewise shifting of the bodies while permitting free relative horizontal swiveling thereof. Due to the extensions of the projections 22 into the casting 24, excessive relative sidewise shifting of the adjacent end portions of the bodies is prevented, but the connection is such as to permit a limited amount of relative sidewise shifting which is necessary in service.

The before mentioned truck bolsters 16 and the transverse truck member T comprise parts of a car truck which includes truck side frames and end sills 36 and 38 respectively, channels in the instance shown, though this is merely by way of example. The side frames and end sills are connected by stiffening angles 40, and the spaced elements 26 of the transverse truck member T are connected to the webs of the side frames by U-shaped connectors 42. From the construction described it will be apparent that the truck frame, intermediate the end sills is stiffened against weaving and other strains by the transverse truck member thus providing a rugged yet inexpensive and simple construction.

The bolsters 16 are positioned adjacent the truck end sills 38 and are arranged in the longitudinal plane of oppositely arranged pedestals and comprise unitary members, substantially channel-shaped in the instance shown, having their end portions upwardly offset as at 44 to define depressed areas 46 intermediate the ends with which the guides or bearing elements 14 are formed. Obviously the guides 14 may be formed as independent members and be secured to the upper surfaces of the bolsters by suitable fasteners if desired.

The ends of the bolsters are downwardly flanged as at 48 and are provided with depressed lateral extensions 49 on their side edges defining spring seats 50 by which the bolsters are resiliently supported on springs 52 arranged in upwardly opening spring pockets 54 formed adjacent each end of the heads 56 of pedestals 58 secured to the side frames 36 adjacent the ends thereof; the said heads having vertically arranged end blocks 60 with which stops 62 on extensions 49 are adapted to contact and by which the bolsters 16 are positioned and restrained against longitudinal movement relative to the truck.

The pedestals comprise the before mentioned head portions 56 and columns 57, the head portions each including a horizontally arranged inwardly extending body portion 64 and an attaching portion 66 substantially angle-shaped in cross section and adapted to rest against the web 68 and lower flange 70 of the side frame and to be secured thereto by suitable fasteners such as rivets 72. As shown in Fig. 2 the body portion 64 is provided with depressed portions adjacent each end to define the before mentioned spring pockets 54. Intermediate its ends and between the spring pockets 54, the body portion is provided with a circular spring seat 74 for positioning a spring 76 arranged between the pedestal head and the journal box 78 which latter is retained between the pedestal columns 57. It will be apparent that transverse shifting of the bolsters 16 relative to the truck frame is limited by contact of the flanges 48 with the pedestal attaching portions 66.

The present invention also contemplates the provision of means for supporting a foot plate which bridges the space between the adjacent car bodies and to accomplish this the forward ends of the castings 4 are recessed to provide supporting shoulders 80 which receive a foot plate support 82 of annular form provided with an upper marginal flange 84 to which latter a substantially circular foot plate 86 is secured in any suitable manner. In effect, the castings 4 are provided with offset projections 22 which define the before mentioned supporting shoulders 80. As shown clearly, the foot plate laps the castings 4 and extends adjacent the threshold castings 88 which are arcuate in shape as indicated clearly in Figure 1. The foot plate is provided with a removable section 90 to permit removal of pin 32 from between the adjacent end portions of the bodies. In service it may be desirable to provide suitable side bearings and they are shown diagrammatically at 92 but inasmuch as they form no specific part of the present invention they are neither described nor shown in detail.

The car of the present invention provides a construction in which the respective bodies may swivel horizontally relative to each other about an axis defined by the spacer element 32; the bodies having bearing in the guides on the truck bolsters. Relative vertical shifting of the bodies is limited by the interengagement of the respective castings 4 or the interengagement of the adjacent end portions of the bodies while excessive relative sidewise shifting of the bodies is prevented by the engagement of the pin 32 in the adjacent end portions of the bodies and also by the extension of the projections 22 into the truck center casting 24. The load is carried by the truck bolsters; the adjacent end portions being supported at the interengagement of the truck bearing members and guides, this interengagement in effect, coupling the adjacent end portions of the bodies together. While coupling the bodies together as just mentioned or connecting them to the truck by the cooperating truck and body bearing members is believed to be efficient in service, it is obvious that the bodies are prevented from separation by reason of the extension on the adjacent end portions of the bodies into the truck center casting.

The pin 32 is a combined spacer or buffing element. Obviously the pin retains the bodies in their proper spaced relation, and it is apparent that buffing shocks are transmitted from the bodies to the truck and from one body to the other by means of the pin.

The parts are so proportioned as to permit necessary clearance to obtain the flexibility necessary to compensate for variations in track grades, and pulling stresses, in addition to being taken by the truck members and guides, are also transmitted to the bodies through the truck center casting and the body castings 4.

It is believed that the invention shown and described herein will be fully apparent to those skilled in the art, but it is to be understood that the drawings are for illustrative purposes only and various changes in the form and proportions of the construction may be made within the scope of the appended claims, without departing from the spirit of the invention.

What is claimed is:

1. In an articulated car comprising a pair of car bodies, a truck arranged beneath the adjacent end portions of said bodies, a pair of truck bolsters for supporting the adjacent end portions of said bodies and relative to which said bodies are capable of horizontal swiveling movement, said bolsters being arranged adjacent the ends of the truck, a truck center casting into which the adjacent end portions of said bodies extend, and a combined spacer and buffer element arranged between the said adjacent end portions and supported by said truck center casting.

2. A railway car truck comprising side frames and end sills, truck bolsters adjacent the end sills, a transverse truck member extending between and connected to the side frames intermediate the bolsters, and a truck center casting supported by the transverse truck member.

3. In an articulated car, a truck, pedestals for the truck provided with head portions and abutments at the ends thereof, resilient means adjacent said abutments, a pair of truck bolsters mounted on said resilient means and restrained against movement longitudinally of the truck by said abutments, a pair of car bodies having their adjacent end portions supported by the bolsters, and cooperating bearing elements on said bodies and bolsters for permitting horizontal swiveling movement of the bodies.

4. In an articulated car, a truck, pedestals for the truck provided with head portions and abutments at the ends thereof, resilient means adjacent said abutments, a pair of truck bolsters mounted on said resilient means and restrained against movement longitudinally of the truck by said abutments, a pair of car bodies having their adjacent end portions supported by the bolsters, a truck center casting into which the adjacent end portions of said bodies extend, and means supported by the center casting and arranged between the adjacent end portions for preventing excessive relative sidewise shifting of the bodies.

5. In an articulated car, a truck, pedestals for the truck provided with head portions and abutments at the ends thereof, resilient means adjacent said abutments, a pair of truck bolsters mounted on said resilient means and restrained against movement longitudinally of the truck by said abutments, a pair of car bodies having their adjacent end portions supported by the bolsters, a truck center casting into which the adjacent end portions of said bodies extend, and a combined spacer and buffer element arranged between the adjacent end portions of the bodies and supported by the truck center casting, said element defining the axis of swiveling movement of the bodies.

6. In an articulated car, a truck, pedestals for the truck provided with upwardly projecting abutments, a pair of truck bolsters resiliently supported above the pedestals and restrained against excessive movement relative to the latter by said abutments, a pair of car bodies having their adjacent end portions supported by the bolsters and capable of horizontal swiveling movement about an axis intermediate the truck bolsters, a truck center casting into which the adjacent end portions of said bodies extend, a spacer member arranged between the adjacent end portions and supported by the truck center casting, said spacer member defining the axis of swiveling movement of the car bodies and restraining the adjacent end portions against excessive relative sidewise shifting.

7. In an articulated car, a truck, pedestals for the truck provided with upwardly projecting abutments, a pair of truck bolsters resiliently supported above the pedestals and restrained against excessive movement relative to the latter by said abutments, a pair of car bodies having their adjacent end portions supported by the bolsters and capable of horizontal swiveling movement about an axis intermediate the truck bolsters, a transverse truck member intermediate the bolsters, a center casting carried by the transverse member and into which the adjacent end portions of said bodies extend whereby said bodies are restrained against excessive relative sidewise shifting, and a combined spacer and buffer element arranged between the adjacent end portions of the bodies and supported by said center casting.

8. In an articulated car, a truck, pedestals for the truck provided with upwardly projecting abutments, a pair of truck bolsters resiliently supported above the pedestals and restrained against excessive movement relative to the latter by said abutments, a pair of car bodies having their adjacent end portions supported by the bolsters and capable of horizontal swiveling movement about an axis intermediate the truck bolsters, a transverse truck member intermediate the bolsters, a center casting carried by the transverse member and into which the adjacent end portions of said bodies extend whereby said bodies are restrained against excessive relative sidewise shifting, said adjacent end portions being interengaged to restrain them against excessive relative vertical shifting, and a combined spacer and buffer element arranged between the adjacent end portions of the bodies and supported by said center casting.

9. In an articulated car, a truck, pedestals for the truck provided with upwardly projecting abutments, a pair of truck bolsters resiliently supported above the pedestals and restrained against excessive movement relative to the latter by said abutments, a pair of car bodies having their adjacent end portions supported by the bolsters and capable of horizontal swiveling movement about an axis intermediate the truck bolsters, a transverse truck member intermediate the bolsters, a center casting carried by the transverse member, interengaged body connection castings secured to the adjacent end portions of the bodies provided with longitudinally recessed projections extended into the said center casting for transmitting pulling stresses between the bodies and between the bodies and truck and for restraining the bodies against excessive relative sidewise shifting, and a spacer element arranged in the recesses in said projections and supported by the truck center casting.

10. In an articulated car, a pair of car bodies, a truck arranged beneath the adjacent end portions of said bodies, pedestals for the truck, a pair of truck bolsters for supporting the adjacent end portions of the car bodies arranged in the horizontal planes between opposite pedestals, bearings on the bolsters, bearing members on the adjacent end portions of said bodies cooperating with said bearings, and a combined spacer and buffer element interposed between the adjacent end portions of the bodies and supported by a truck part.

11. A railway car truck comprising side frames and end sills, pedestals secured to the side frames, truck bolsters arranged in the plane between oppositely arranged pedestals and resiliently supported by and above said pedestals, a transverse truck member extending between the side frames intermediate the bolsters, and a truck center casting supported by said transverse member.

12. In an articulated car, a truck, pedestals for the truck provided with head portions, a pair of truck bolsters resiliently supported above the head portions of the pedestals, means restraining said bolsters against excessive movement longitudinally of the truck, a pair of car bodies having their adjacent end portions supported by the bolsters, and cooperating bearing elements on said bodies and bolsters for connecting the bodies and bolsters for permitting horizontal swiveling movement of the bodies.

13. In an articulated car, a truck, pedestals for the truck, a pair of truck bolsters resiliently supported over the pedestals, means restraining the bolsters against excessive movement longitudinally of the truck, a pair of car bodies having their adjacent end portions supported by the bolsters, cooperating bearing elements on the bolsters and bodies for connecting the bodies to the truck and permitting horizontal swiveling movement of the bodies relative to the truck, a truck center casting into which the adjacent end portions of the body extend, and a combined spacer and buffer element arranged between the adjacent end portions of the bodies and supported by the truck center casting, said element defining the axis of swiveling movement of the bodies.

14. In an articulated car, a truck, pedestals for the truck, a pair of truck bolsters resiliently supported over the pedestals, means restraining the bolsters against excessive movement longitudinally of the truck, a pair of car bodies having their adjacent end portions supported by the bolsters, cooperating bearing elements on the bolsters and bodies for connecting the bodies to the truck and permitting horizontal swiveling movement of the bodies relative to the truck, and a combined spacer and buffer element arranged between the adjacent end portions of the bodies and supported by a truck part.

15. In an articulated car, a truck, pedestals for the truck, a pair of truck bolsters resiliently supported by the pedestals, means restraining the bolsters against excessive shifting movement longitudinally of the truck, a pair of car bodies supported by the bolsters, and having their adjacent end portions interengaged whereby they are restrained against excessive relative vertical shifting, cooperating bearing elements on the bolsters and bodies permitting horizontal swiveling movement of the bodies, and a combined spacer and buffer element arranged between the adjacent end portions of the bodies and supported by a truck part, said element restraining the car bodies against excessive relative sidewise shifting.

In witness whereof I have hereunto set my hand.

ALLEN W. CLARKE.